US008228169B2

(12) United States Patent
Ikeda

(10) Patent No.: US 8,228,169 B2
(45) Date of Patent: Jul. 24, 2012

(54) INFORMATION COMMUNICATION SYSTEM, FACILITY APPARATUS, USER APPARATUS, AND METHODS FOR CONTROLLING FACILITY APPARATUS AND USER APPARATUS

(75) Inventor: Hirotane Ikeda, Nagoya (JP)

(73) Assignee: DENSO CORPORATION, Kariya (JP)

( * ) Notice: Subject to any disclaimer, the term of this patent is extended or adjusted under 35 U.S.C. 154(b) by 1104 days.

(21) Appl. No.: 12/078,881

(22) Filed: Apr. 8, 2008

(65) Prior Publication Data

US 2008/0252413 A1  Oct. 16, 2008

(30) Foreign Application Priority Data

Apr. 11, 2007 (JP) .................... 2007-104154

(51) Int. Cl.
G08B 5/22 (2006.01)
(52) U.S. Cl. ..................................... 340/7.31
(58) Field of Classification Search ............... 340/7.31, 340/5.8, 7.33, 10.42
See application file for complete search history.

(56) References Cited

U.S. PATENT DOCUMENTS

| 6,118,888 | A  | * | 9/2000 | Chino et al. ............... 382/118 |
| 7,254,705 | B2 | * | 8/2007 | Yokota et al. ............. 713/155 |
| 7,567,689 | B2 | * | 7/2009 | Iwasaki ..................... 382/115 |
| 2009/0171688 | A1 | | 7/2009 | Ikeda |

FOREIGN PATENT DOCUMENTS

| JP | A-H10-269287 | 10/1998 |
| JP | A-2000-307731 | 11/2000 |
| JP | A-2001-265922 | 9/2001 |
| JP | A-2002-63334 | 2/2002 |
| JP | A-2002-109195 | 4/2002 |
| JP | A-2003-263641 | 9/2003 |
| JP | A-2003-271867 | 9/2003 |
| JP | A-2003-273803 | 9/2003 |
| JP | A-2005-128928 | 5/2005 |
| JP | A-2005-128929 | 5/2005 |
| JP | A-2006-212300 | 8/2006 |
| JP | A-2006-318065 | 11/2006 |

OTHER PUBLICATIONS

Office Action dated Jun. 7, 2011 in corresponding JP application No. 2007-104154 (and English translation).
Office Action mailed Feb. 7, 2012 in corresponding JP application No. 2007-104154 (and English translation).

* cited by examiner

*Primary Examiner* — Vernal Brown
(74) *Attorney, Agent, or Firm* — Posz Law Group, PLC

(57) ABSTRACT

An information communication system is capable of allowing a service provider at a facility to appropriately attend a user visiting the facility in accordance with an intention of the user. The information communication system includes a user apparatus carried by the user and a facility apparatus installed at a facility the user may visit. The user apparatus enters the user intention concerning the facility service provider and transmits intention information indicating the entered user intention to the facility apparatus capable of short range wireless communication. The user apparatus transmits appearance information indicating the user's captured face picture to the facility apparatus. When receiving the intention information from the user apparatus, the facility apparatus allows a display section to display the user intention indicated by the intention information along with the user's captured face picture indicated by the appearance information received from the user apparatus.

24 Claims, 11 Drawing Sheets

| SALESPERSON | SPECIALIZED IN | AVAILABLE LANGUAGE | GENDER | ... |
|---|---|---|---|---|
| TARO YAMADA | • MEN'S FORMAL WEAR<br>• MEN'S CASUAL WEAR | • JAPANESE | MALE | ... |
| HANAKO YAMADA | • WOMEN'S CASUAL WEAR<br>• WOMEN'S FANCY GOODS | • JAPANESE<br>• ENGLISH | FEMALE | ... |
| MARK | • MEN'S CASUAL WEAR | • ENGLISH | MALE | ... |
| LUCY | • WOMEN'S FORMAL WEAR | • FRENCH | FEMALE | ... |
| ⋮ | ⋮ | ⋮ | ⋮ | |

INFORMATION COMMUNICATION SYSTEM, FACILITY APPARATUS, USER APPARATUS, AND METHODS FOR CONTROLLING FACILITY APPARATUS AND USER APPARATUS

CROSS REFERENCE TO RELATED APPLICATION

This application is based on and incorporates herein by reference Japanese Patent Application No. 2007-104154 filed on Apr. 11, 2007.

FIELD OF THE INVENTION

The present invention relates to an information communication system used for a facility a user may visit.

BACKGROUND OF THE INVENTION

Conventionally, there have been proposed systems for promoting the use of facilities. In the sales promotion system disclosed in Patent Document 1, for example, a seller of commodities uses a shop terminal to upload sales promotion information including free service points to a server. A buyer uses a mobile telephone terminal to receive the uploaded sales promotion information. After acquiring the sales promotion information, the mobile telephone terminal user, as a buyer, visits the shop that delivered the sales promotion information. At this time, the buyer transmits his or her personal information (name, age, gender, address, telephone number, e-mail address, etc.) to a shop terminal through infrared communication. The seller can receive the buyer's personal information using the shop terminal, easily add the information to a customer list, and improve the sales promotion.

Patent Document 1: JP-2003-271867 A

Factors for promoting the use of a facility include an appropriate attendance by a service provider at the facility. Some users visiting the facility may wish active attendances from the service provider of the facility. Others may feel annoyed by such active attendances. An appropriate attendance by the service provider at the facility depends on users visiting the facility.

It is preferable but difficult for a service provider at a facility to attend a user visiting the facility in consideration for the user's intention. According to the construction described in Patent Document 1 above, the service provider at the facility can recognize personal information about a user visiting the facility but cannot recognize the user's intention.

SUMMARY OF THE INVENTION

The present invention has been made in consideration of the foregoing. It is therefore an object of the present invention to provide an information communication system capable of allowing a facility service provider to attend a user visiting the facility in accordance with the user intention.

According to an example of the present invention, an information communication system is provided as follows. The information communication system comprises a user apparatus carried by a user and a facility apparatus provided for a facility a user may visit. The user apparatus includes: (i) an intention input control unit for supplying an intention of a user carrying the user apparatus to a service provider at the facility; (ii) an intention information transmission control unit for transmitting intention specification information capable of specifying an input user intention to a facility apparatus capable of communicating with the user apparatus under condition that the intention input control unit inputs a user intention; and (iii) an appearance information transmission control unit for transmitting appearance specification information capable of specifying external characteristics of a user carrying the user apparatus to a facility apparatus capable of communicating with the user apparatus. The facility apparatus includes: (i) a notification control unit for notifying, when receiving the intention specification information from the user apparatus, a service provider at the facility of a user intention specified based on the intention specification information along with external characteristics of a user specified based on appearance specification information received from the user apparatus.

As another example of the present invention, the facility apparatus included in the above information communication system is provided.

As another example of the present invention, the user apparatus included in the above information communication system is provided.

According to another example of the present invention, a method is provided for controlling the above facility apparatus. The method comprises: notifying a service provider at the facility of a user intention specified based on the intention specification information along with external characteristics of a user specified based on appearance specification information received from the user apparatus under condition that the intention specification information is received from the user apparatus. Relating to this example, as yet another example of the present invention, a computer readable medium comprising instructions being executed by a computer is provided, wherein the instructions includes the above method for controlling the user apparatus and the method is computer-implemented.

According to another example of the present invention, a method is provided for controlling the above user apparatus. The method comprises: (i) supplying an intention of a user carrying the user apparatus to a service provider at the facility; (ii) transmitting intention specification information capable of specifying an input user intention to a facility apparatus capable of communicating with the user apparatus under condition that a user intention is input; and (iii) transmitting appearance specification information capable of specifying external characteristics of a user carrying the user apparatus to a facility apparatus capable of communicating with the user apparatus. Relating to this example, as yet another example of the present invention, a computer readable medium comprising instructions being executed by a computer is provided, wherein the instructions includes the above method for controlling the user apparatus and the method is computer-implemented.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Embodiments of the present invention will be described in further detail with reference to the accompanying drawings.

<1. First Embodiment>

The information communication system according to a first embodiment will be described below.

<1-1. Overall Construction>

Figure 1:
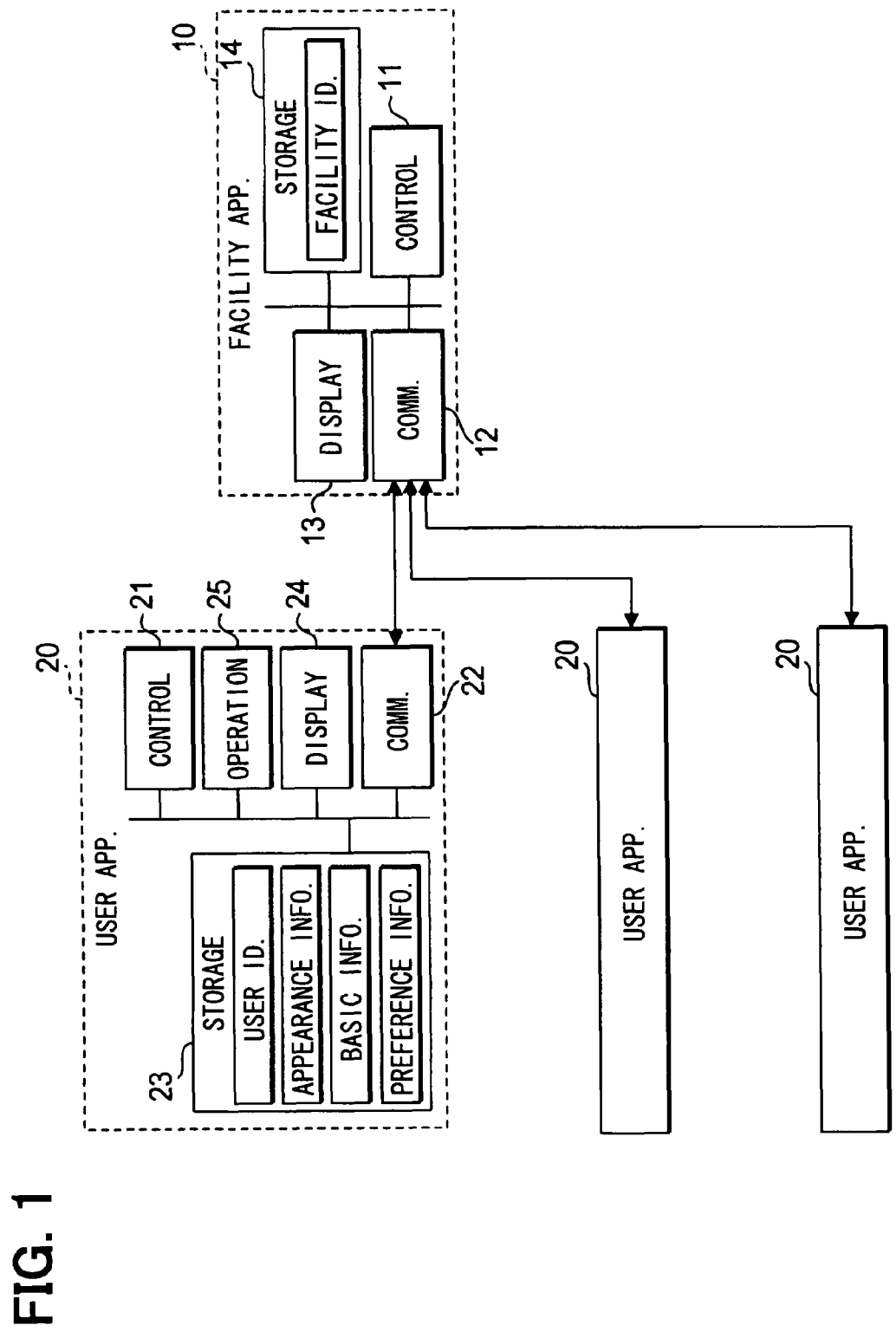
FIG. 1 is a block diagram schematically showing an information communication system according to a first embodiment.

FIG. 1 is a block diagram schematically showing the information communication system according to the first embodiment. The information communication system allows a salesperson as a service provider to attend a user in accordance with the user's intention at a facility (a store such as a distribution outlet or a restaurant) the user may visit. The information communication system includes a facility apparatus 10 installed at the facility and a user apparatus 20 carried by the user.

The following describes specific constructions of the apparatuses 10 and 20 included in the information communication system.

<1-1-1. Construction of the Facility Apparatus>

The facility apparatus 10 includes a control section 11, a communication section 12, a display section 13, and a storage section 14.

The control section 11 mainly includes a known microcomputer having a CPU, a ROM, and a RAM, and performs various processes.

The communication section 12 provides short range wireless communication with the user apparatus 20 of a user visiting a facility. The communication section 12 can wirelessly communicate with the user apparatus 20 in the communication area. The embodiment forms the communication area so as to cover an entire range where the user visiting the facility may be detected. The short range wireless communication includes Bluetooth (registered trademark), DSRC (Dedicated Short Range Communication), wireless LAN, and ZIGBEE (registered trademark), for example.

The display section 13 displays various types of information for a facility salesperson. For example, the display section 13 uses an liquid crystal display.

The storage section 14 can store various types of information. The storage section 14 stores facility identification information, i.e., identification information specific to a facility where the facility apparatus 10 is installed. The facility identification information is not only specific to the facility where the facility apparatus 10 is installed but also capable of specifying the type (of business) of the facility. For example, the facility identification information includes a 10-digit number. First three digits represent the facility type. Last seven digits represent a unique number.

<1-1-2. Construction of the User Apparatus>

The user apparatus 20 is a portable terminal (mobile telephone terminal in this embodiment) that can be carried by the user using the facility. The user apparatus 20 includes a control section 21, the communication section 22, a storage section 23, a display section 24, and an operation section 25.

The control section 21 mainly includes a known microcomputer having a CPU, a ROM, and a RAM, and performs various processes. The communication section 22 provides short range wireless communication with the facility apparatus 10.

The storage section 23 can store various types of information and stores user identification information, appearance information, basic information, and preference information. The storage section 23 writes and updates these types of information as needed when the user subscribes to the information communication system for using it, for example.

The user identification information is unique to the user carrying the user apparatus 20. The appearance information represents external characteristics of the user carrying the user apparatus 20. According to the embodiment, the appearance information is equivalent to a facial portrait, i.e., captured image information representing the user's face.

The basic information represents attributes of the user carrying the user apparatus 20. According to the embodiment, the basic information includes user's name, height, weight, age, available language, gender, family structure, and hobby.

The preference information indicates preferences of the user carrying the user apparatus 20. The embodiment categorizes the preference information according to facility types. For example, the preference information about a clothing store contains preferred colors and styles. Specifically, the information about preferred colors includes clothing colors such as blue, green, and violet, color tones, brightly colored or patterned cloth. The information about preferred styles includes trend such as traditional and type such as loose-fitting for easy movement.

Figure 2:
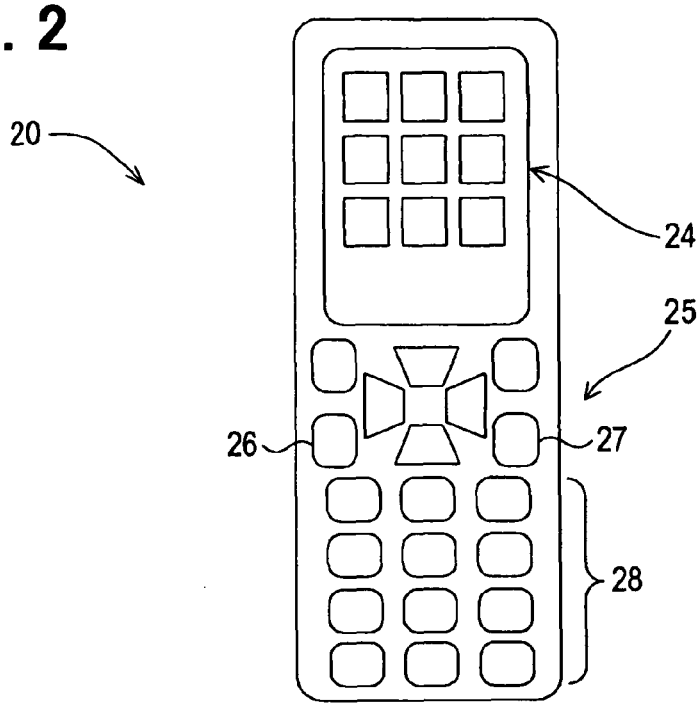
FIG. 2 is an explanatory diagram showing an operation section of a user apparatus.

The display section 24 displays various types of information and uses an liquid crystal display, for example. The operation section 25 is used for the user to enter an instruction as an outside operation. As shown in FIG. 2, the operation section 25 includes multiple keys (switches) the user can press. The keys include an attendance request key 26 and an attendance refusing key 27. These are special keys for an intention notification operation that notifies a facility salesperson of an intention of the user carrying the user apparatus 20.

The attendance request key 26 notifies an attendance requesting intention, i.e., an intention to request attendance by the salesperson as a service provider. When the user carrying the user apparatus 20 presses the attendance request key 26 in the facility, a process (to be described) allows the display section 13 of the facility apparatus 10 in the facility to display a message indicating the attendance requesting intention along with the user's captured face image (e.g., see FIG. 5).

The attendance refusing key 27 notifies an attendance refusing intention, i.e., an intention to refuse attendance by the salesperson. When the user carrying the user apparatus 20 presses the attendance refusing key 27 in the facility, a process (to be described) allows the display section 13 of the facility apparatus 10 in the facility to display a message indicating the attendance refusing intention along with the user's captured face image.

The embodiment previously provides the attendance requesting intention and the attendance refusing intention as candidates for user intentions. The user can select either intention to notify it to the facility salesperson.

The keys provided for the operation section 25 include dial keypad 28 for entering information such as numbers and letters. The user can transmit additional information for the attendance requesting intention. For example, the user can enter a numeric value for specifying a preferred time or timing of attendance by the salesperson. The user can enter text for notifying his or her intention to the salesperson.

Figure 5:
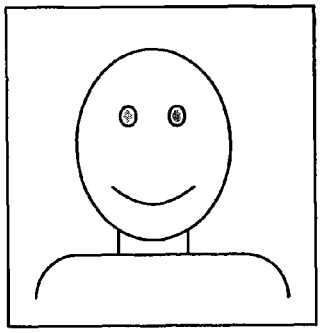
FIG. 5 is an explanatory diagram showing information displayed on a display section.

For example, let us suppose that the user enters numeric value "3" on the dial keypad and then presses the attendance request key 26 at the facility. A process (to be described) starts and allows the display section 13 of the facility apparatus 10 provided for the facility to display a message indicating the user's intention to request attendance three minutes later (FIG. 5).

Figure 6:
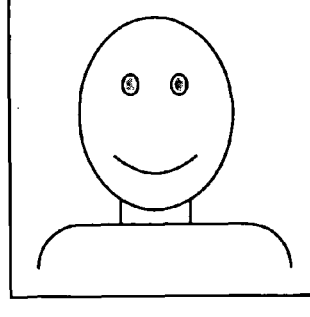
FIG. 6 is an explanatory diagram showing information displayed on a display section.

Further, let us suppose that the user uses the dial keypad 28 to enter any text such as a purpose to visit the facility or an interested commodity and then presses the attendance request key 26 at the facility. A process (to be described) starts and allows the display section 13 of the facility apparatus 10 provided for the facility to display the text entered by the user (FIG. 6).

<1-2. Processes Performed in the Information Communication System>

The following describes processes performed on the apparatuses 10 and 20 included in the information communication system according to the first embodiment.

<1-2-1. Information Transmission Process>

Figure 3:
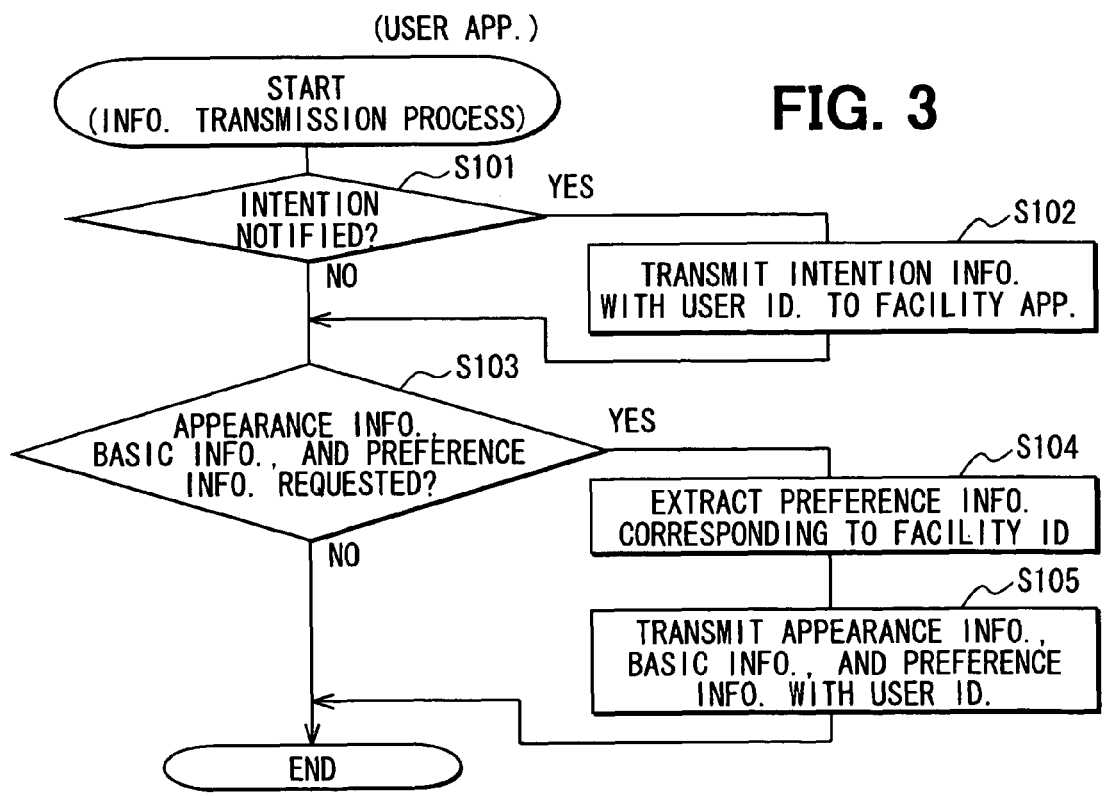
FIG. 3 is a flow chart showing an information transmission process according to the first embodiment.

With reference to a flow chart in FIG. 3, the following describes an information transmission process performed by the control section 21 of the user apparatus 20. The information transmission process starts when the user apparatus 20 is turned on. The process is continuously repeated until the user apparatus 20 is turned off.

When starting the information transmission process, the control section 21 determines at Step S101 whether or not the above-mentioned intention notification operation is performed on the operation section 25.

The process proceeds to Step S102 when it is determined at Step S101 that the intention notification operation is performed. At Step S102, the control section 21 transmits intention information indicating the user intention corresponding to the intention notification operation as well as the user identification information stored in the storage section 23 to the facility apparatus 10 capable of short range wireless communication with the user apparatus 20. The process then proceeds to Step S103. The intention information represents one of the attendance requesting intention and the attendance refusing intention as the user intention. In particular, the intention information also contains a requested attendance timing or a specific request when specified.

The process directly proceeds to Step S103 when it is determined at Step S101 that no intention notification operation is performed. At Step S103, the control section 21 determines whether or not to receive a user information transmission request for appearance information, basic information, and preference information. As will be described later, the facility apparatus 10 receiving the intention information transmits the user information transmission request along with facility identification information about the facility provided with the facility apparatus 10.

The process proceeds to Step S104 when it is determined at Step S103 that the user information transmission request is received. The control section 21 extracts the preference information that is stored in the storage section 14 and corresponds to a facility type indicated by the facility identification information received along with the user information transmission request. That is, the control section 21 extracts the preference information about the facility the user visits.

At Step S105, the control section 21 transmits the preference information extracted at Step S104 and the appearance information and the basic information (about the user carrying the user apparatus 20) stored in the storage section 23 as well as the user identification information to the requesting facility apparatus 10. The process once ends and is repeated from Step S101.

The process once ends and is repeated from Step S101 when it is determined at Step S103 that no user information transmission request is received.

<1-2-2. User Information Display Process>

Figure 4:
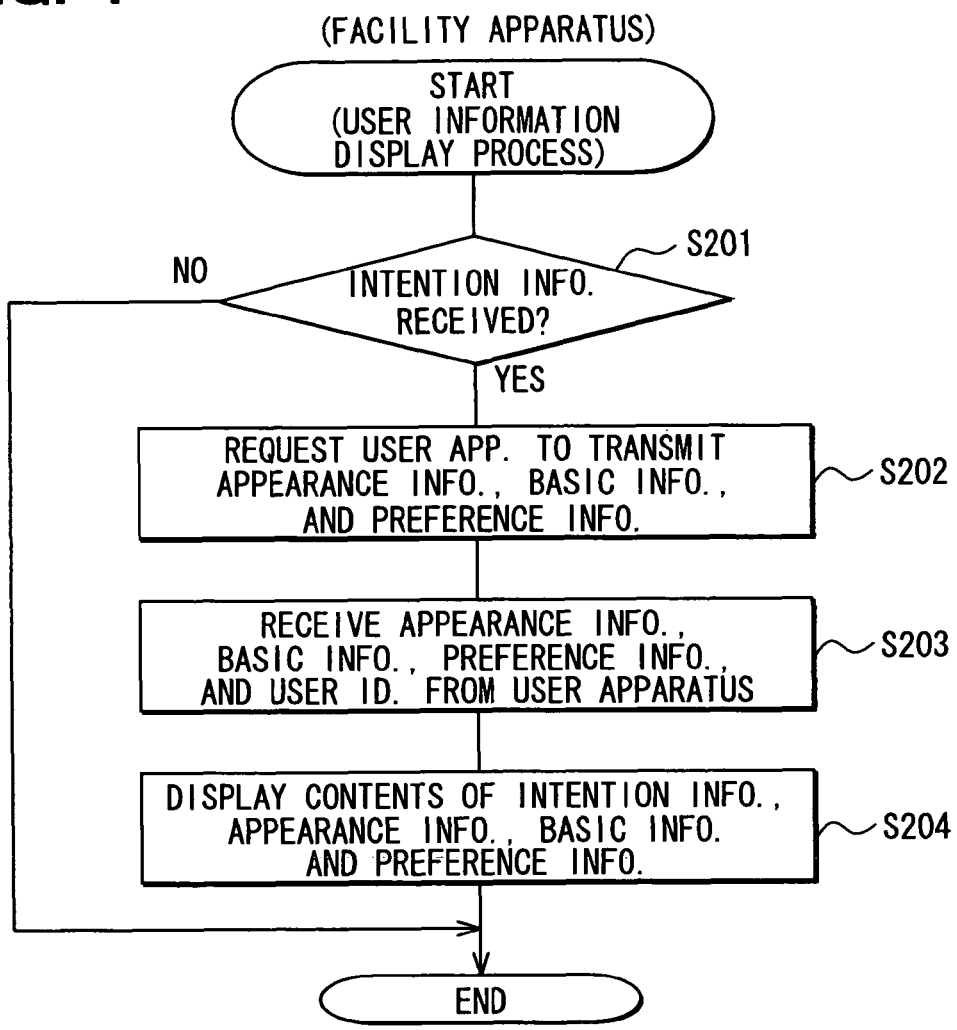
FIG. 4 is a flow chart showing a user information display process according to the first embodiment.

With reference to a flow chart in FIG. 4, the following describes a user information display process performed by the control section 11 of the facility apparatus 10.

When starting the user information display process, the control section 11 determines at Step S201 whether or not the intention information is received. The process proceeds to Step S202 when it is determined that the intention information is received. As mentioned above, the intention information is transmitted from the user apparatus 20 along with the user identification information about the user present in the facility.

At Step S202, the control section 11 transmits a user information transmission request to the user apparatus 20 as a transmission origin of the intention information. The user information transmission request is used to transmit the appearance information, the basic information, and the preference information. The user apparatus 20 stores the appearance information, the basic information, and the preference information, and transmits these pieces of information along with the user identification information to the facility apparatus 10 (Step S105 of the information transmission process in FIG. 3).

At Step S203, the control section 11 receives the appearance information, the basic information, the preference information, and the user identification information transmitted from the user apparatus 20. At Step S240, the control section 11 allows the display section 13 to display the contents of the intention information, the appearance information, the basic information, and the preference information received from the user apparatus 20. The process once ends and is then repeated from Step S201.

As shown in FIG. 5, for example, the top left of the display screen displays the content of the intention information "the customer is calling you—three minutes later." The content of the appearance information (captured face picture) is displayed below. The top right of the display screen displays the content of the basic information such as name, height, weight, age, available language, gender, family structure, and hobby. The content of the preference information such as preferred color and style is displayed below.

When the intention information contains the requested attendance timing, the example in FIG. 5 shows "three minutes later" as the timing of the requested attendance by the salesperson. The embodiment displays minutes to reach a time when the user wishes the start of the attendance. A process is performed to update (decrement) the displayed value as the time elapses. The facility salesperson can attend the user at a time point the user wishes independently of the timing when the salesperson confirms the content displayed on the display section 13. The example in FIG. 5 excludes the indication "three minutes later" when the intention information does not contain the requested attendance timing.

When the intention information contains a specific content, the display screen shows text indicating the content as the intention information content. In this example, the text indicates that the today's purpose is to purchase a gift for the accompanying wife for her birthday and she wishes a spring casual shirt.

<1-3. Examples of Use>

The following describes examples of using the information communication system according to the first embodiment.

Let us suppose that the user visits the facility and presses the attendance request key 26 on the operation section 25 of the user apparatus 20. The user apparatus 20 transmits the intention information indicating the attendance requesting intention to the facility apparatus 10 through short range wireless communication. The facility apparatus 10 then acquires the appearance information, the basic information, and the preference information stored in the user apparatus 20. The display section 13 of the facility apparatus 10 displays the intention information representing the attendance requesting intention, user's captured face picture, the basic information, and the preference information. In this case, the intention information provides a message "the customer is calling you." The facility salesperson can find the user based on the captured face picture and actively attend the user.

When the user enters a numeric value before pressing the attendance request key 26, the display section 13 also displays a message such as "three minutes later" as the intention information content (FIG. 5). In this case, the facility salesperson can be ready for attending the user at the scheduled time.

When the user enters text before pressing the attendance request key 26, the display section 13 also displays that text as the intention information content (FIG. 6). In this case, the facility salesperson can actively provide the user with specific services appropriate to the content of the text.

When the user visiting the facility presses the attendance refusing key 27 of the user apparatus 20, the display section 13 displays the intention information indicating the attendance refusing intention, i.e., a message such as "the customer refuses attendance." The facility salesperson can find the user based on the captured face picture and avoid active attendance for the user.

<1-4. Effects>

As mentioned above, the information communication system according to the first embodiment provides the following effects.

The user visiting the facility can easily notify a facility salesperson of the user's intention whether or not to wish the attendance by the salesperson. The user can comfortably use the facility. Otherwise, the user may not find a salesperson even though the user needs the salesperson's attendance. On the contrary, the user may be spoken to by a salesperson even though the user does not need the salesperson's attendance. The facility salesperson can understand the intention of the user visiting the facility and take proper action in accordance with the user intention. In addition, the facility salesperson can easily identify multiple unknown users visiting the facility by their appearances based on captured face pictures even when the users are unlocatable. The salesperson can recognize the intention of each user.

The operation section 25 of the user apparatus 20 is provided with the special keys (attendance request key 26 and attendance refusing key 27) for notifying attendance requesting intention and attendance refusing intention. The user can easily convey his or her intention to the facility salesperson.

The user can specify the time to wish the attendance by the salesperson as additional information for the attendance requesting intention. The user can be efficiently attended by the salesperson. The user can enter text that specifies a specific request. The user can flexibly convey his or her intention. For example, the user can convey intentions of not only his or her own but also his or her companion.

The facility salesperson can recognize the basic information indicating user attributes and the preference information indicating user preferences. The salesperson can actively provide services appropriate to the user. The facility apparatus 10 is constructed to be capable of short range wireless communication with the user apparatus 20. The facility apparatus 10 receives various types of information only from the user apparatus 20 communicating with the facility apparatus 10, i.e., the user apparatus 20 carried by the user visiting the facility. Accordingly, the display section 13 displays only information about the user visiting the facility. The facility salesperson can confirm only necessary information.

The facility apparatus 10 receives such information from the user apparatus 20 as the appearance information indicating external characteristics of a user visiting the facility and the basic information and the preference information about the user. The facility apparatus 10 need not previously store information about the user visiting the facility. The facility salesperson can take appropriate action for a user who visits the facility for the first time.

The mobile telephone terminal is used as the user apparatus 20. When using the facility, the user can use the information communication system without needing for particularly carrying a dedicated apparatus.

<1-5. Correspondence Between Technical Terms Used for the Embodiments and Functions>

In the information communication system according to the first embodiment, the control section 11 of the facility apparatus 10 for performing Step S204 of the user information display process (FIG. 4) may function as a notification control means or unit.

The control section 21 of the user apparatus 20 for performing Step S101 of the information transmission process (FIG. 3) may function as an intention input control means or unit. The control section 21 performing Step S102 may function as an intention information transmission control means or unit. The control section 21 performing Step S105 may function as an appearance information transmission control means or unit and a user information transmission control means or unit.

<2. Second Embodiment>

The following describes the information communication system according to a second embodiment.

<2-1. Overall Construction>

Figure 7:
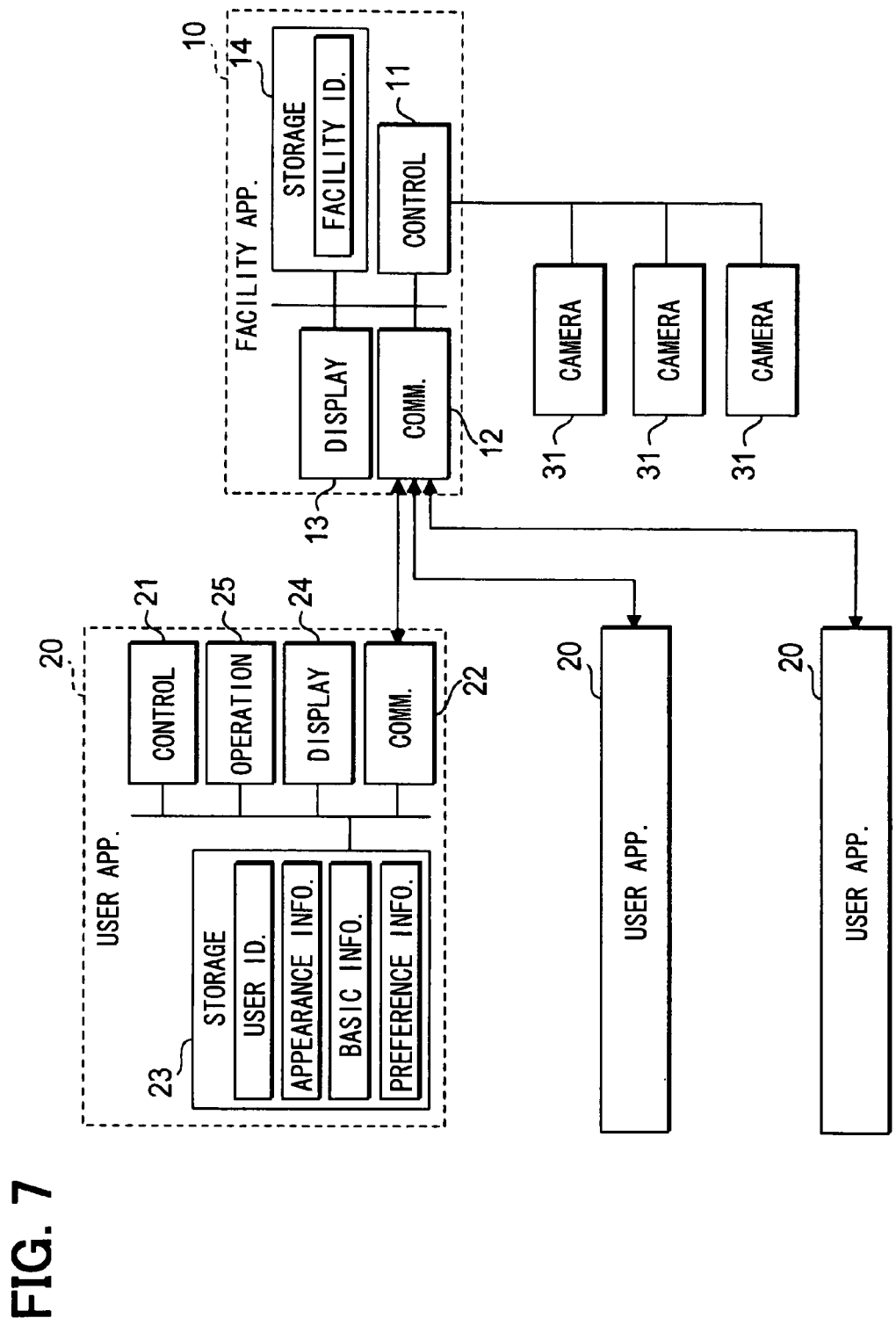
FIG. 7 is a block diagram schematically showing an information communication system according to a second embodiment.

FIG. 7 is a block diagram schematically showing the information communication system according to a second embodiment.

Figure 8:
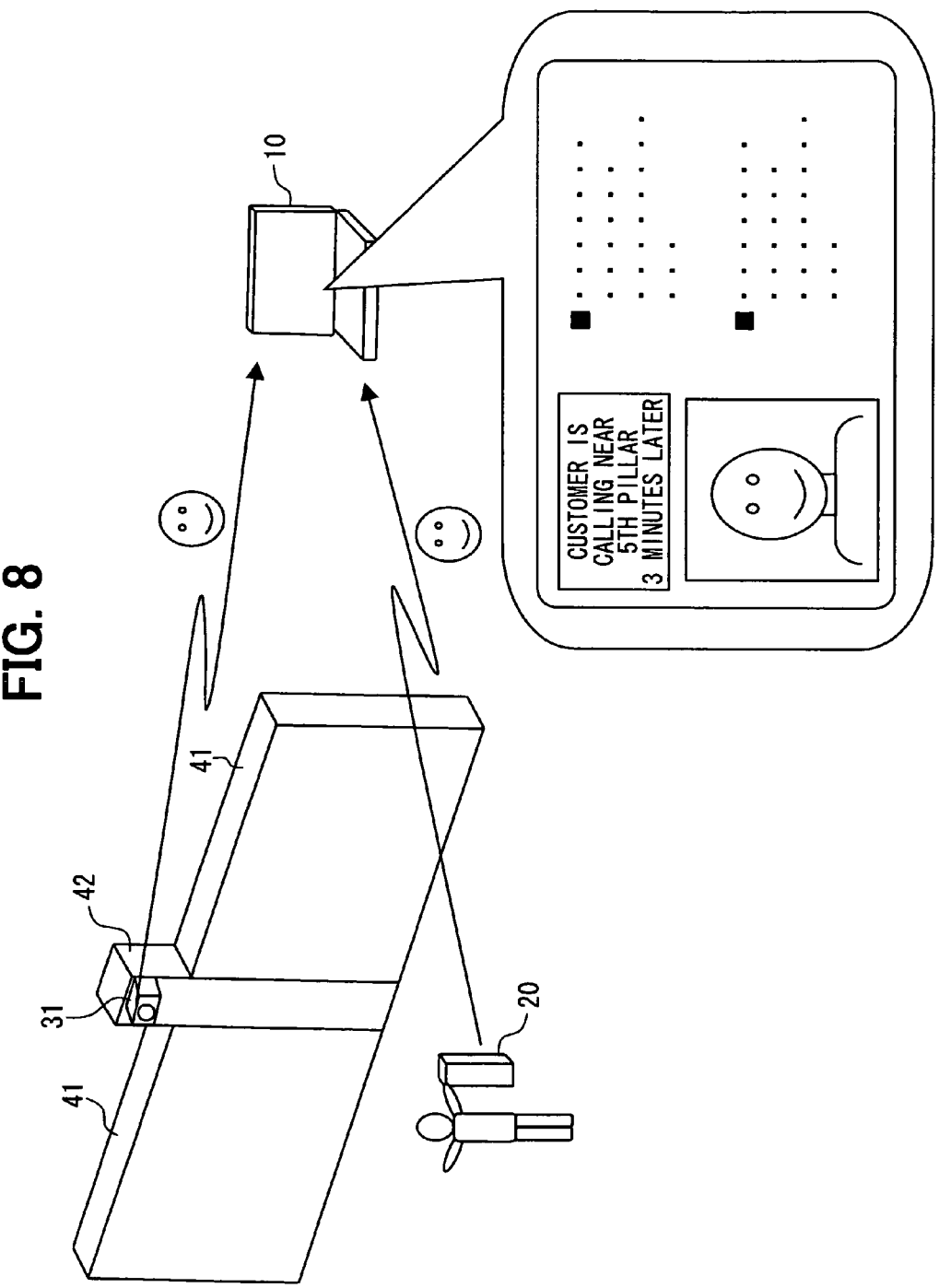
FIG. 8 is an explanatory diagram showing placement of a camera.

The information communication system according to the second embodiment differs from the information communication system according to the first embodiment in that the control section 11 of the facility apparatus 10 is connected to cameras 31 provided at multiple locations of the facility so as to be capable of communication. As shown in FIG. 8, for example the camera 31 is mounted on the top of a pillar 42 adjacent to a display rack 41 so as to be able to capture the face of a user in front of the display rack 41 in the facility. There may be a camera used to prevent shoplifting. Such camera can be used as the camera 31. The following mainly describes differences from the information communication system according to the first embodiment. The same parts or components are depicted by the same reference numerals and a detailed description is omitted for simplicity.

<2-2. Processes Performed on the Information Communication System>

The following describes processes performed on the apparatuses 10 and 20 included in the information communication system according to the second embodiment.

<2-2-1. Information Transmission Process>

The information transmission process performed by the control section 21 of the user apparatus 20 is the same as the information transmission process according to the first embodiment (FIG. 3) and a detailed description is omitted for simplicity.

<2-2-2. User Information Display Process>

Figure 9:
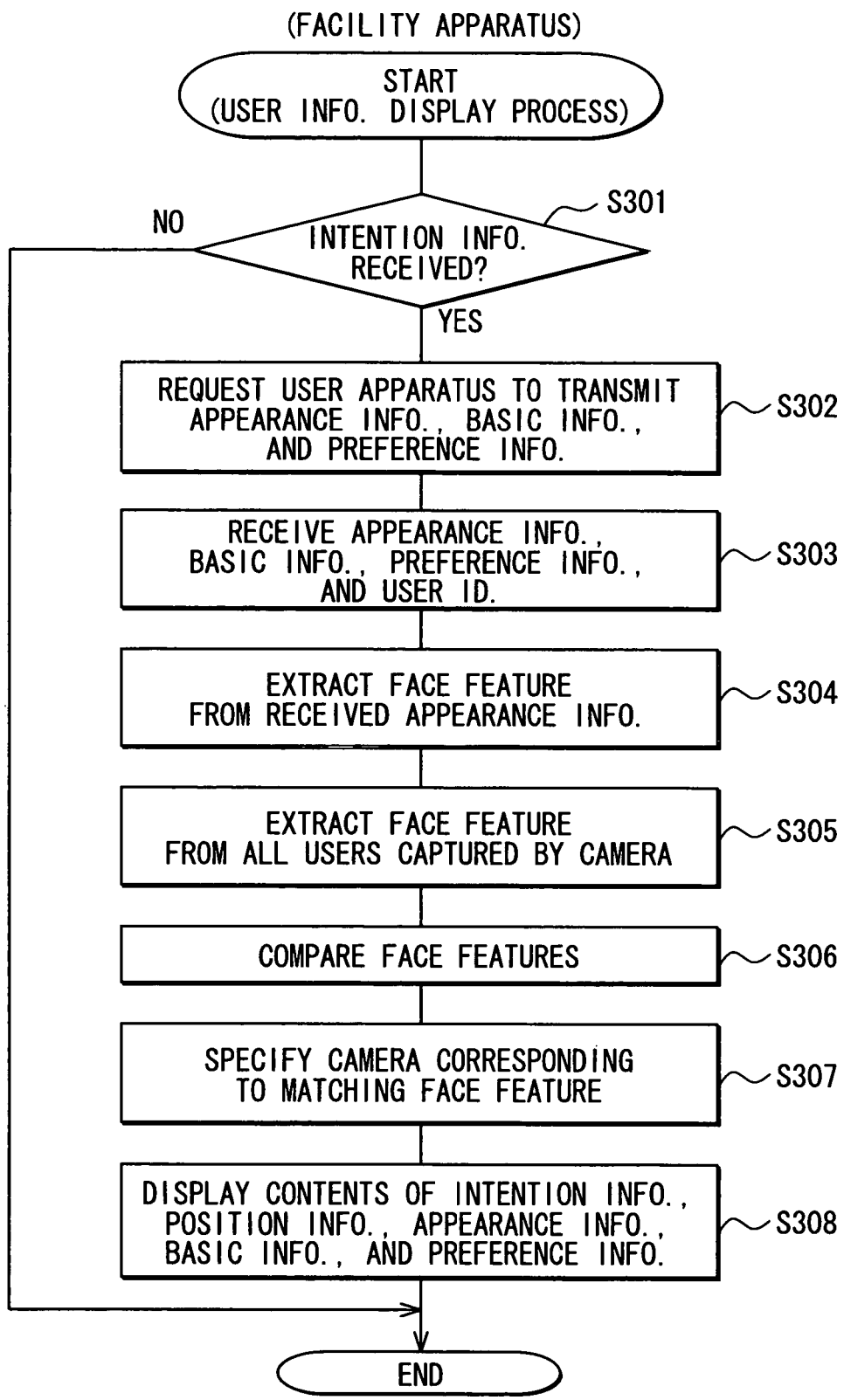
FIG. 9 is a flow chart showing a user information display process according to the second embodiment.

With reference to a flow chart in FIG. 9, the following describes the user information display process performed by the control section 11 of the facility apparatus 10. The user information display process according to the second embodiment differs from the user information display process according to the first embodiment (FIG. 4) in that Step S204 is replaced by Step S308 and Steps S304 through S307 are added. The process contents of Steps S301 through S303 are the same as those of Steps S201 through S203 and a detailed description is omitted for simplicity.

At Step S304, the control section 11 extracts a face feature point from the user's captured face picture indicated by the appearance information received at Step S303. That is, the control section 11 extracts the face feature point of the user who performed an intention notification operation. At Step S305, the control section 11 extracts face feature points from the captured face pictures of all the users captured by the camera 31.

At Step S306, the control section 11 compares the face feature point extracted at Step S304 with the face feature point extracted at Step S305 and specifies a face feature point that is extracted at Step S305 and matches the face feature point extracted at Step S304. This step specifies the user who is found in the facility and performed the intention notification operation.

At Step S307, the control section 11 specifies a camera that captured a face picture containing the face feature point matching the face feature point extracted at Step S304. The control section 11 assigns position information (e.g., "near the fifth pillar") to the position where the camera is installed. That is, the control section 11 locates the user's whereabouts by specifying the camera used for capturing the user who performed the intention notification operation. The position information becomes null (hidden) when no face feature point matches the face feature point extracted at Step S304, i.e., when the camera 31 does not capture the user who performed the intention notification operation.

At Step S308, the control section 11 allows the display section 13 to display the contents of the intention information, the appearance information, the basic information, and the preference information received from the user apparatus 20 and the content of the position information. The process once ends and is then repeated from Step S201. As shown in FIG. 8, for example, the display screen displays the contents of the intention information and the position information at the upper left, i.e., "the customer is calling you—near the fifth pillar—three minutes later" according to the example in FIG. 8. The content of the appearance information (captured face picture) is displayed below. The display screen displays the content of the basic information such as name, height, weight, age, available language, gender, family structure, and hobby at the top right. The content of the preference information such as preferred color and style is displayed below.

<2-3. Examples of Use>

The following describes examples of using the information communication system according to the second embodiment. Let us suppose that the user visits the facility and presses the attendance request key 26 on the operation section 25 of the user apparatus 20. The user apparatus 20 transmits the intention information indicating the attendance requesting intention to the facility apparatus 10 through short range wireless communication. The facility apparatus 10 then acquires the appearance information, the basic information, and the preference information stored in the user apparatus 20. The facility apparatus 10 extracts the user's face feature point from the appearance information. The extracted user's face feature point is compared to face feature points of all the users captured by the cameras 31 installed in the facility. The position information indicates the position of the camera 31 that captured the user matching the face feature point. The display section 13 of the facility apparatus 10 displays the intention information indicating the attendance requesting intention (the message "the customer is calling you"), the position information (e.g., near the fifth pillar), the user's captured face picture, basic information, and preference information. The facility salesperson can recognize the user's whereabouts ("near the fifth pillar" in this example). Based on the captured face picture, the salesperson can find the user and take active action.

When the user enters a numeric value before pressing the attendance request key 26, the display section 13 also displays a message such as "three minutes later" as the intention information content (FIG. 8). In this case, the facility salesperson can be ready for attending the user at the scheduled time.

When the user enters text before pressing the attendance request key 26, the display section 13 also displays that text as the intention information content. In this case, the facility salesperson can actively provide the user with specific services appropriate to the content of the text.

When the user visiting the facility presses the attendance refusing key 27 of the user apparatus 20, the display section 13 displays the intention information indicating the attendance refusing intention, i.e., a message such as "the customer refuses attendance." The facility salesperson can find the user based on the captured face picture and avoid active attendance for the user.

<2-4. Effects>

As mentioned above, the information communication system according to the second embodiment provides the following effects in addition to the effects of the first embodiment.

The facility apparatus 10 locates the user performing the intention notification operation and displays the location along with the user's captured face picture. The facility salesperson can easily find the user.

<2-5. Correspondence Between Technical Terms Used for the Embodiments and Functions>

In the information communication system according to the second embodiment, the control section 11 of the facility apparatus 10 for performing Steps S304 through S307 of the user information display process (FIG. 9) may function as a position detection control means or unit. The control section 11 for performing Step S308 may function as a notification control means or unit.

The control section 21 of the user apparatus 20 for performing Step S101 of the information transmission process (FIG. 3) may function as an intention input means or unit. The control section 21 for performing Step S102 may function as an intention information transmission control means or unit. The control section 21 for performing Step S105 may function as an appearance information transmission control means or unit and a user information transmission control means or unit.

<3. Third Embodiment>

The following describes the information communication system according to a third embodiment.

<3-1. Overall Construction>

Figure 10:
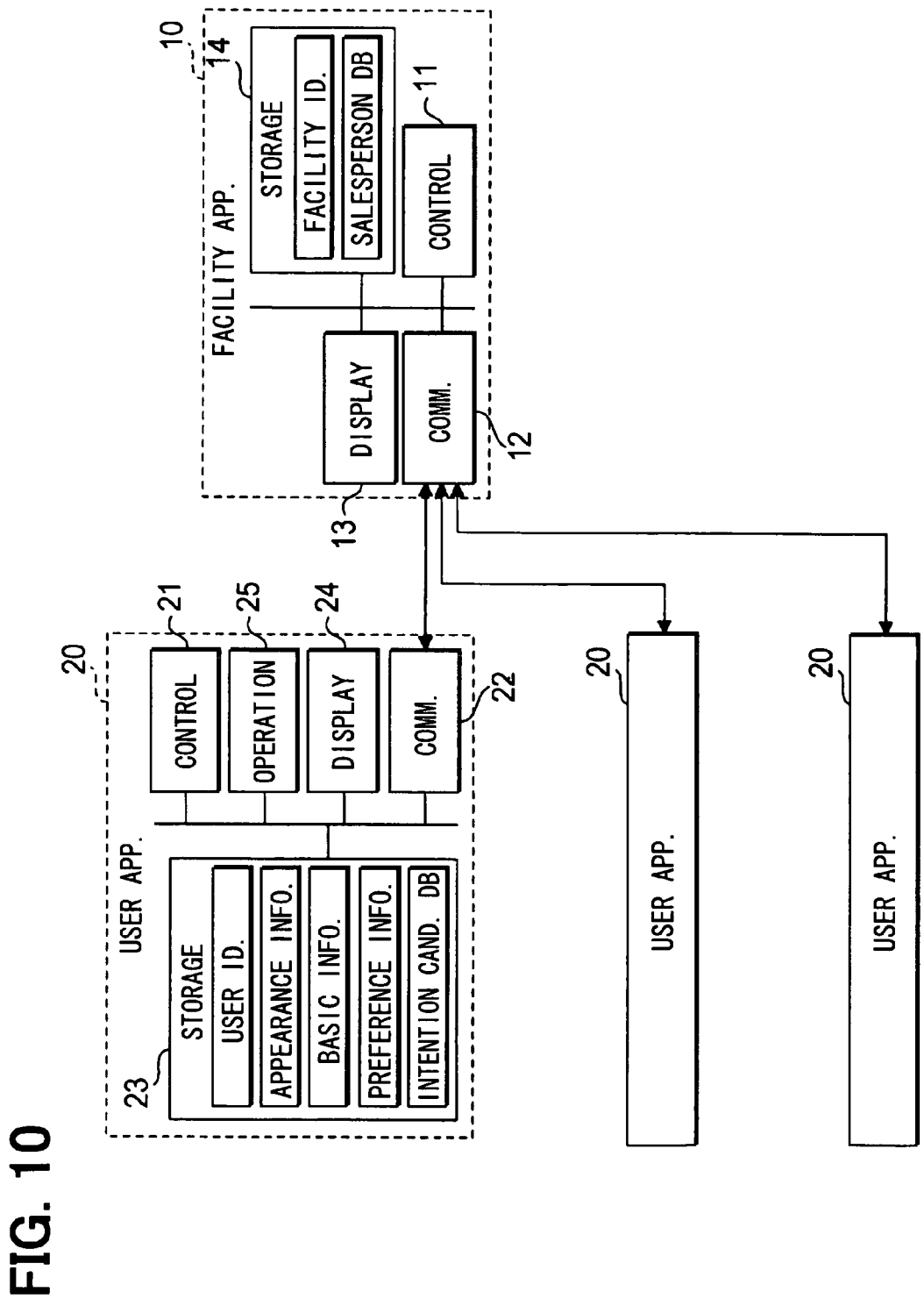
FIG. 10 is a block diagram schematically showing an information communication system according to a third embodiment.

FIG. 10 is a block diagram schematically showing the information communication system according to the third embodiment.

The information communication system according to the third embodiment differs from the information communication system according to the first embodiment (FIG. 1) in that the storage section 14 of the facility apparatus 10 stores a salesperson database and that the storage section 23 of the user apparatus 20 stores an intention candidate database.

Figures 11, 12:
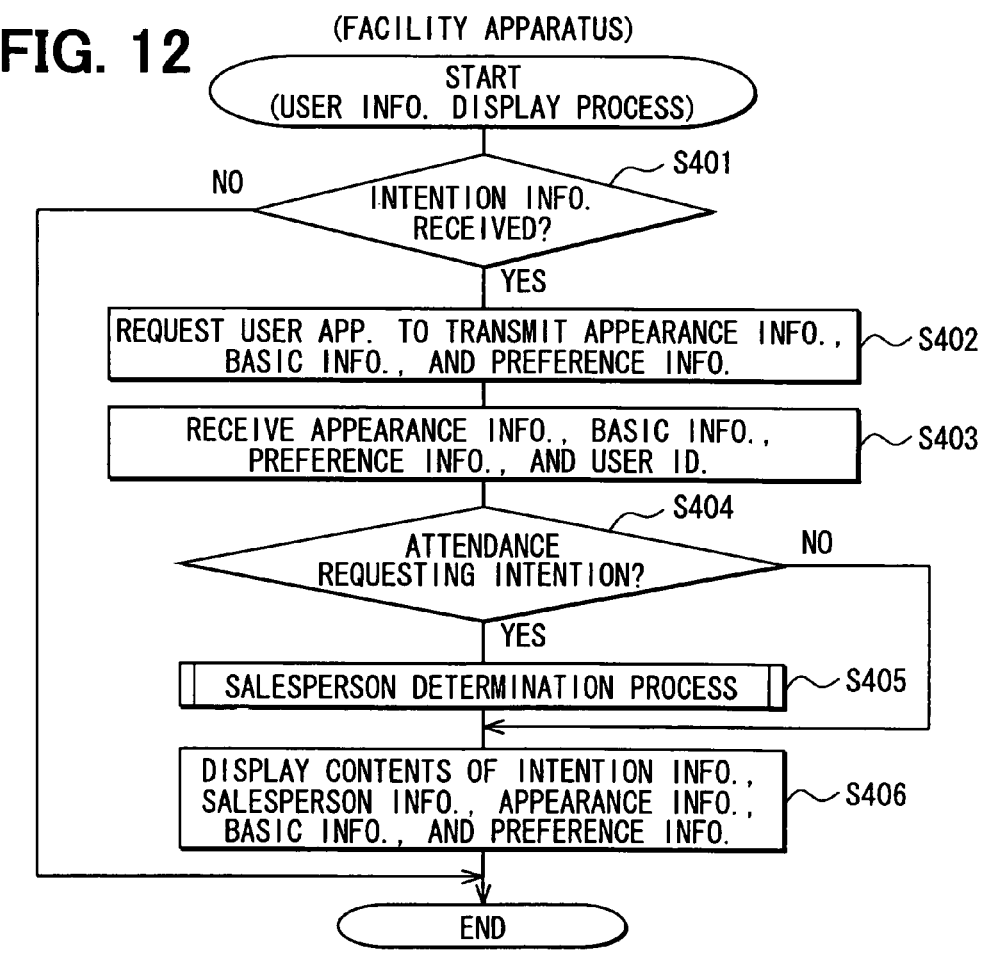
FIG. 11 is an explanatory diagram showing a salesperson database.
FIG. 12 is a flow chart showing a user information display process according to a third embodiment.

As shown in FIG. 11, the salesperson database stores information about a salesperson. According to the embodiment, the information about each salesperson contains a salesperson name, specialized field, available language, and gender.

The intention candidate database stores specific intention candidates that can be notified to facility salespersons. According to the embodiment, the intention candidate database stores intention candidates according to facility types. During the intention notification operation, the user apparatus 20 allows the display section 24 to display selectable intention candidates. The user apparatus 20 transmits a selected intention to the facility apparatus 10.

Specifically, the user apparatus 20 first displays candidates such as "clothing store" and "restaurant" as facility type choices. When "clothing store" is selected, the user apparatus 20 displays candidates such as "men's" and "women's" as purchase candidates in the clothing store. When "men's" is selected and the attendance request key 26 is pressed, the user apparatus 20 transmits the intention information to the facility apparatus 10 so as to notify that the user intends to purchase men's clothes.

The following mainly describes differences from the information communication system according to the first embodiment. The same parts or components are depicted by the same reference numerals and a detailed description is omitted for simplicity.

<3-2. Processes Performed on the Information Communication System>

The following describes processes performed on the apparatuses 10 and 20 included in the information communication system according to the third embodiment.

<3-2-1. Information Transmission Process>

The information transmission process performed by the control section 21 of the user apparatus 20 is the same as the information transmission process according to the first embodiment (FIG. 3) and a detailed description is omitted for simplicity.

<3-2-2. User Information Display Process>

With reference to a flow chart in FIG. 12, the following describes the user information display process performed by the control section 11 of the facility apparatus 10. The user information display process according to the third embodiment differs from the user information display process according to the first embodiment (FIG. 4) in that Step S204 is replaced by Step S406 and Steps S404 and S405 are added.

The process contents of Steps S401 through S403 are the same as those of Steps S201 through S203 and a detailed description is omitted for simplicity.

At Step S404, the control section 11 determines whether or not the intention information received from the user apparatus 20 indicates an attendance requesting intention.

Figure 13:
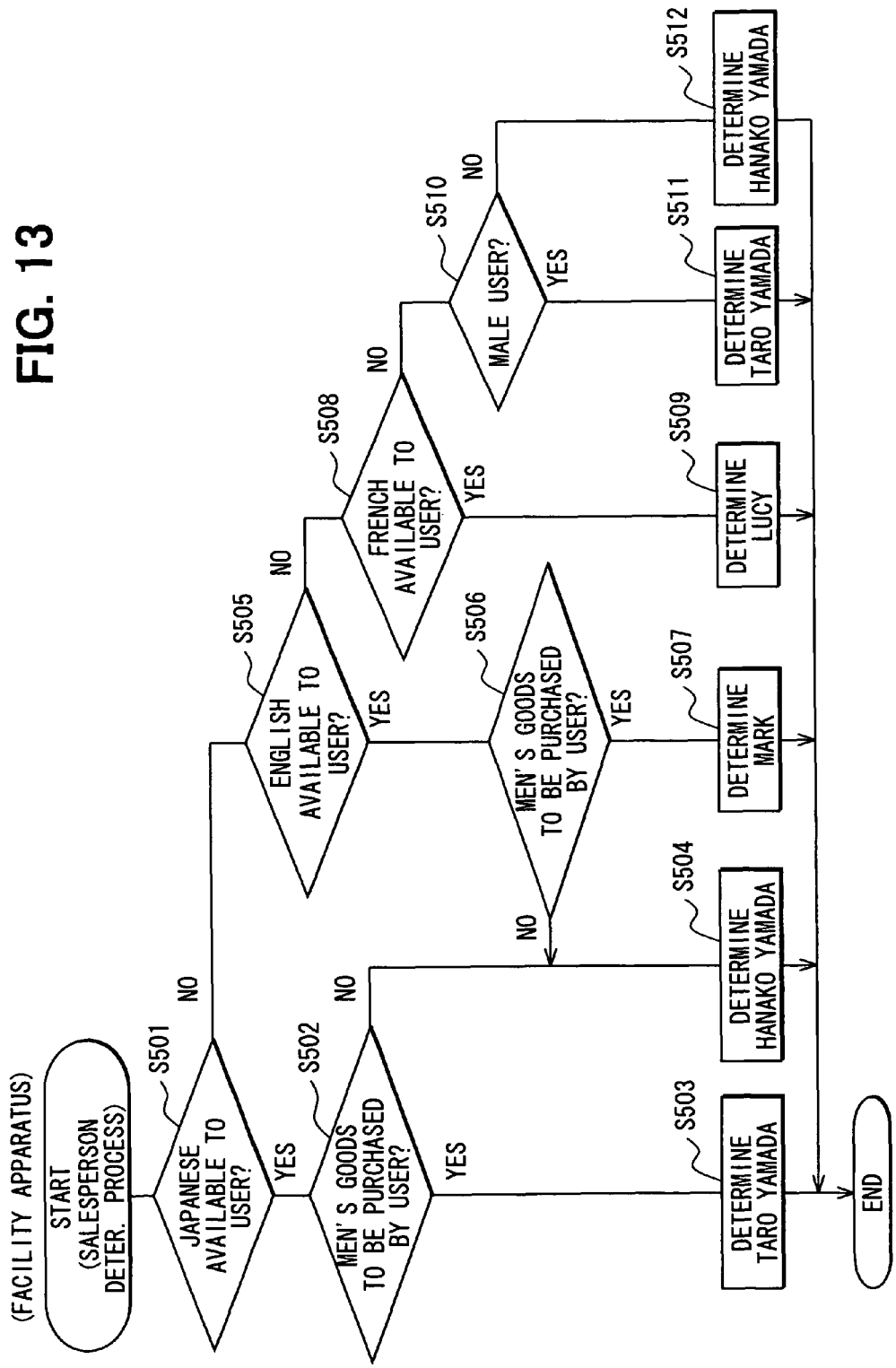
FIG. 13 is a flow chart showing a salesperson determination process.

The process proceeds to Step S405 when it is determined at Step S404 that the intention information indicates the attendance requesting intention. The control section 11 performs a salesperson determination process for determining a salesperson who is best suited to attend the user having the attendance requesting intention. The process proceeds to Step S406. A specific content of the salesperson determination process will be described later (FIG. 13).

The process jumps to Step S406 when it is determined at Step S404 that the received intention information does not indicate the attendance requesting intention. At Step S406, the control section 11 allows the display section 13 to display the contents of the intention information, the appearance information, the basic information, and the preference information received from the user apparatus 20 and the content of the salesperson information about the salesperson determined at Step S405. The process once ends and is then repeated from Step S401.

Figure 14:
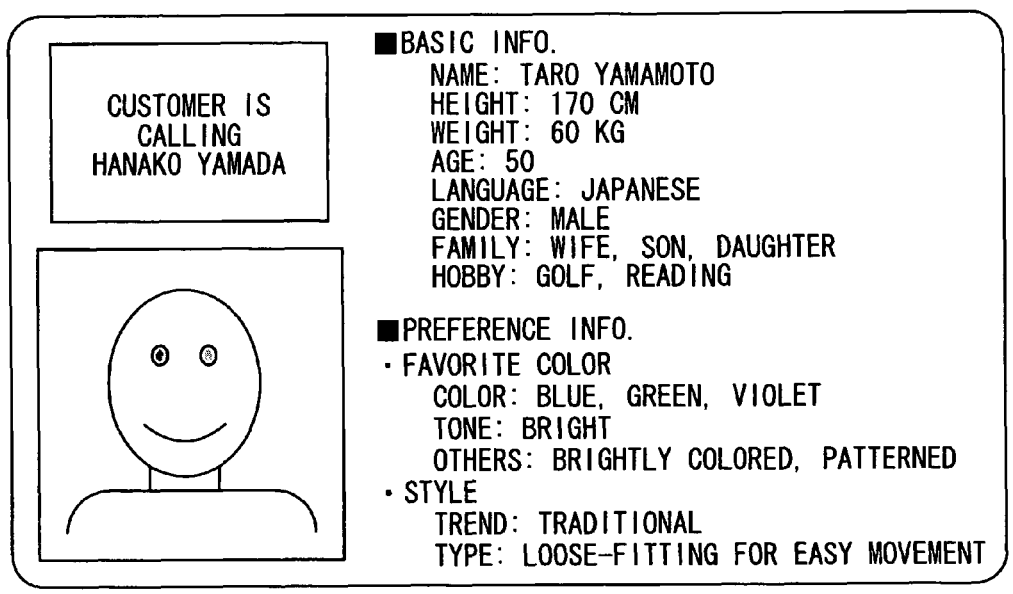
FIG. 14 is an explanatory diagram showing information displayed on a display section.

As shown in FIG. 14, for example, the display screen displays the contents of the intention information and the salesperson information at the top left ("the customer is calling Hanako Yamada" according to the example in FIG. 14) and the content of the appearance information below (captured face picture). The display screen displays the content of the basic information such as name, height, weight, age, available language, gender, family structure, and hobby at the top right. The content of the preference information such as preferred color and style is displayed below.

The position information becomes null (hidden) when it is determined at Step S404 that the received intention information does not indicate the attendance requesting intention.

<3-2-3. Salesperson Determination Process>

With reference to a flow chart in FIG. 13, the following describes the salesperson determination process performed at Step S405 of the above-mentioned user information display process (FIG. 12).

When starting the salesperson determination process, the control section 11 determines at Step S501 whether or not the Japanese language is available for the user having the attendance requesting intention based on the basic information received from the user apparatus 20.

The process proceeds to Step S502 when it is determined at Step S501 that the Japanese language is available for the user. The control section 11 determines whether or not the user intends to purchase men's commodities based on the intention information received from the user apparatus 20.

The process proceeds to Step S503 and selects "Taro Yamada" as a salesperson appropriate for attending the user when it is determined at Step S502 that the user intends to purchase men's commodities. The salesperson determination process then terminates.

The process proceeds to Step S504 and selects "Hanako Yamada" as a salesperson appropriate for attending the user when it is determined at Step S502 that the user does not intend to purchase men's commodities. The salesperson determination process then terminates.

The process proceeds to Step S505 when it is determined at Step S501 that the Japanese language is not available for the user. The control section 11 determines whether or not the English language is available for the user based on the basic information received from the user apparatus 20.

The process proceeds to Step S506 when it is determined at Step S505 that the English language is available for the user. The control section 11 determines whether or not the user intends to purchase men's commodities based on the intention information received from the user apparatus 20.

The process proceeds to Step S507 and selects "Mark" as a salesperson appropriate for attending the user when it is determined at Step S506 that the user intends to purchase men's commodities. The salesperson determination process then terminates.

The process proceeds to Step S504 and selects "Hanako Yamada" as a salesperson appropriate for attending the user when it is determined at Step S506 that the user does not intend to purchase men's commodities. The salesperson determination process then terminates.

The process proceeds to Step S508 when it is determined at Step S505 that the English language is not available for the user. The control section 11 determines whether or not the French language is available for the user based on the basic information received from the user apparatus 20.

The process proceeds to Step S509 and selects "Lucy" as a salesperson appropriate for attending the user when it is determined at Step S508 that the French language is available for the user. The salesperson determination process then terminates.

The process proceeds to Step S510 when it is determined at Step S508 that the French language is not available for the user. The control section 11 determines whether or not the user is male based on the basic information received from the user apparatus 20.

The process proceeds to Step S511 and selects "Taro Yamada" as a salesperson appropriate for attending the user when it is determined at Step S510 that the user is male. The salesperson determination process then terminates.

The process proceeds to Step S512 and selects "Hanako Yamada" as a salesperson appropriate for attending the user when it is determined at Step S510 that the user is not male. The salesperson determination process then terminates.

The salesperson determination process determines a salesperson appropriate for attending the user having the attendance requesting intention.

<3-3. Examples of Use>

The following describes examples of using the information communication system according to the third embodiment. Let us suppose that the user visits the facility and presses the attendance request key 26 on the operation section 25 of the user apparatus 20. The user apparatus 20 transmits the intention information indicating the attendance requesting intention to the facility apparatus 10 through short range wireless communication. The facility apparatus 10 acquires the appearance information, the basic information, and the preference information stored in the user apparatus 20. The facility apparatus 10 determines a salesperson appropriate for attending the user based on the intention information and the basic information. The display section 13 of the facility apparatus 10 displays the intention information indicating the attendance requesting intention (the message showing "the customer is calling"), the salesperson information (e.g., "Hanako Yamada), and the user's captured face picture, basic information, and preference information (FIG. 14). Hanako Yamada, a facility salesperson, can find the user based on the captured face picture and actively attend the user.

When the user enters a numeric value before pressing the attendance request key 26, the display section 13 also displays a message such as "three minutes later" as the intention information content. In this case, Hanako Yamada, the facility salesperson, can be ready for attending the user at the scheduled time.

When the user enters text before pressing the attendance request key 26, the display section 13 also displays that text as the intention information content. In this case, Hanako Yamada, the facility salesperson, can actively provide the user with specific services appropriate to the content of the text.

When the user visiting the facility presses the attendance refusing key 27 of the user apparatus 20, the display section 13 displays the intention information indicating the attendance refusing intention, i.e., a message such as "the customer refuses attendance." The facility salesperson can find the user based on the captured face picture and avoid active attendance for the user.

<3-4. Effects>

As mentioned above, the information communication system according to the third embodiment provides the following effects in addition to the effects of the first embodiment.

The facility apparatus 10 stores the information about the facility salespersons. The facility apparatus 10 determines and displays a salesperson appropriate for the user based on the information received from the user apparatus 20 and the stored information. An appropriate salesperson can attend the user.

<3-5. Correspondence Between Technical Terms Used for the Embodiments and Functions>

In the information communication system according to the third embodiment, the storage section 14 of the facility apparatus 10 may function as a service provider information storage device. The control section 11 for performing Step S405 of the user information display process (FIG. 12) may function as a service provider determination control means or unit. The control section 11 of the facility apparatus 10 for performing Step S406 may function as a notification control means or unit.

The control section 21 of the user apparatus 20 for performing Step S101 of the information transmission process (FIG. 3) may function as an intention input control means or unit. The control section 21 for performing Step S102 may function as an intention information transmission control means or unit. The control section 21 for performing Step 105 may function as an appearance information transmission control means or unit and a user information transmission control means or unit.

<4. Modifications>

While there have been described specific preferred embodiments of the present invention, it is to be distinctly understood that the present invention may be embodied in various modifications.

<4-1. User Apparatus>

While the above-mentioned embodiments have exemplified the mobile telephone terminal as the user apparatus according to the embodiment, the invention is not limited thereto. For example, it may be preferable to use storage apparatuses capable of wireless communication including a portable information device such as PDA and an electronic key (smart key) for a vehicle. Further, it may be preferable to use storage apparatuses such as an IC card, an Edy card (registered trade mark, serving as a prepaid proximity contactless-type IC card), a USB memory, and an SD card for proximity contactless-type or contact-type data exchange. The portable apparatus may be provided as a dedicated apparatus without using the other apparatuses.

While the embodiments assume that a single user uses the user apparatus 20, the invention is not limited thereto. Multiple users (e.g., family members) can use the common user apparatus 20. In this case, the user apparatus 20 stores information (user identification information, the appearance information, the basic information, and the preference information) about the users on a user basis. The user apparatus 20 transmits the user information specified by the intention notification operation to the facility apparatus 10. This construction can also provide the same effects as those of the embodiments.

<4-2. Facility Apparatus>

While the embodiments exemplified the clothing store as a facility for installing the facility apparatus 10, the facility capable of using the facility apparatus according to the invention is not limited thereto. For example, the facility represents retail stores for furniture and electric appliances, mass sales store such as hardware store and large-scale furniture shop, large-scale store such as department store and supermarket, eating and drinking establishments such as restaurant and pub, barber shop and hair care salon, lodging facilities such as hotel, hospital, gymnasium, automobile dealer and parking facilities, play facilities such as amusement park airport, railroad station, harbor, and distribution outlets for audiovisual contents. The facility service provider includes a person who sells commodities at the facility.

<4-3. Intention Input Control Unit>

While the embodiments have exemplified entry of user intentions based on operations of the intention input control unit or means according to the embodiment, i.e., the attendance request key 26 and the attendance refusing key 27 as special keys for intention notification operations, the invention is not limited thereto.

For example, an existing key on the user apparatus 20 may be used for the intention notification operation. When the user apparatus 20 is a mobile telephone terminal, a special application can be used to enable a specified operation mode. In this mode, an existing key such as a speech key or a power key can function as the attendance request key or the attendance refusing key. For example, the icons (FIG. 2) displayed on the display section 24 may contain an icon for notifying the attendance requesting intention or the attendance refusing intention. Selecting the icon may perform the intention notification operation.

While the embodiments provide the attendance requesting intention and the attendance refusing intention as intention candidates in advance, the invention is not limited thereto. Only one intention (e.g., only the attendance requesting intention) can be provided as the intention candidate.

According to the above-mentioned embodiments, the user enters any text to the user apparatus 20 as the specific content of a request for the salesperson. The entered text is displayed on the display section 13 of the facility apparatus 10. However, the information is not limited to text. For example, the user may input his or her speech to the user apparatus 20 so that the speech can be output from the facility apparatus 10. Alternatively, the user may capture any image using a camera mounted on the user apparatus 20 so that the image can be displayed on the display section 13 of the facility apparatus 10.

According to the third embodiment, the storage section 23 of the user apparatus 20 stores the intention candidate database for specific intention candidates categorized into facility types. The invention is not limited thereto. For example, let us suppose that the user visits the facility and the user apparatus 20 becomes capable of short range wireless communication with the facility apparatus 10. Under this condition, the facility apparatus 10 may transmit the intention candidate database concerning the facility to the user apparatus 20. According to this construction, the user apparatus 20 need not store information about facilities the user does not visit. In addition, it is possible to provide an up-to-date intention candidate specialized for each facility.

<4-4. Intention Information Transmission Control Unit>

According to the embodiments, when the user performs the intention notification operation, the user apparatus 20 as the intention information transmission control unit or means of the embodiment transmits the intention information indicating the user intention to the facility apparatus 10 capable of short range wireless communication. The invention is not limited thereto.

For example, the intention information may be transmitted when the intention notification operation is performed and then the facility apparatus 10 capable of short range wireless communication is detected. Under such construction, the user can perform the intention notification operation even when the user apparatus 20 is incapable of short range wireless communication with the facility apparatus 10, e.g., before the user visits the facility.

<4-5. Appearance Information Transmission Control Unit>

According to the embodiments, when a user information transmission request is received from the facility apparatus 10, the user apparatus 20 as the appearance information transmission control unit or means of the embodiment transmits the appearance information indicating the user's captured face picture to the facility apparatus 10. The invention is not limited thereto.

For example, the user apparatus 20 may transmit the appearance information when the facility apparatus 10 capable of short range wireless communication is detected independently of whether or not the intention notification operation is performed. In this case, the facility apparatus 10 may allow the display section 13 to display the content of the appearance information independently of whether or not the intention information is received.

The appearance information may be transmitted along with the intention information under condition that the intention notification operation is performed.

The appearance information is not limited to information representing the user's captured face picture and may include a full-body photograph or a composite sketch, i.e., information capable of visually identifying the user. When image information representing a photographed image is used as the appearance information, an onboard camera may capture an image of the user who is going to drive a vehicle, for example. The captured image may be transmitted to the user apparatus 20 to update the appearance information.

When the facility apparatus 10 stores the appearance information, it may be preferable to transmit information capable of specifying the appearance information, e.g., the user identification information stored and associated with the appearance information. Such construction can decrease the amount of data for the information to be transmitted to the facility apparatus 10 from the user apparatus 20. In this case, the appearance information need not be always stored in the facility apparatus 10 itself and may be stored in another apparatus that can communicate with the facility apparatus 10. For example, a management apparatus may be provided for storing the appearance information about multiple users. The multiple facility apparatuses 10 may acquire the appearance information from the common management apparatus. The appearance information can be efficiently managed.

<4-6. Notification Control Unit>

In the embodiments, the facility apparatus 10 as the notification control unit or means according to the embodiment allows the display section 13 to display the contents of the intention information, the appearance information, the basic information, and the preference information about the user who performed the intention notification operation. The invention is not limited thereto.

For example, the content of the intention information need not be always displayed as a message and may be indicated by lighting of an indicator. In this case, indicator colors or blink patterns can distinguish between multiple types of intention information.

The information may be displayed hierarchically. For example, only the intention information and the appearance information may be displayed on a top screen. Selecting information on the top screen may jump to a detailed display screen that displays the contents of the basic information and the preference information about the user. When the intention information indicates the attendance requesting intention, the basic information and the preference information may be hidden.

Further, notification may be given to the salesperson otherwise than visually. In some ways, the notification is to transfer some information by acting on at least one of five senses of human being. For example, audible notification may be available.

<4-7. User Information Transmission Control Unit>

In the embodiments, the user apparatus 20 as the user information transmission control unit or means according to the embodiment transmits the basic information and the preference information when receiving a user information transmission request from the facility apparatus 10. The invention is not limited thereto.

For example, the user apparatus 20 may transmit the basic information and the preference information upon detection of the facility apparatus 10 capable of short range wireless communication independently of whether or not the intention notification operation is performed. In this case, the facility apparatus 10 may allow the display section 13 to display the contents of the basic information and the preference information independently of whether or not the intention information is received.

The basic information and the preference information may be transmitted along with the intention information under condition that the intention notification operation is performed. The basic information and the preference information are not fixed to those entered by the user but may be automatically entered or updated based on a history of services provided to the user from the facility, for example.

When the facility apparatus 10 stores the basic information and the preference information, it may be preferable to transmit information capable of specifying these pieces of information, e.g., the user identification information stored in association with the basic information and the preference information. Such construction can decrease the amount of data for the information to be transmitted to the facility apparatus 10 from the user apparatus 20. In this case, the basic information and the preference information need not be always stored in the facility apparatus 10 itself and may be stored in another apparatus that can communicate with the facility apparatus 10. For example, a management apparatus may be provided for storing the basic information and the preference information about multiple users. The multiple facility apparatuses 10 may acquire the basic information and the preference information from the common management apparatus. The basic information and the preference information can be efficiently managed.

<4-8. Position Detection Control Unit>

In the second embodiment, the facility apparatus 10 as the position detection control unit or means according to the embodiment locates the user based on the position information about a position of the camera 31 for capturing the user who matches the appearance information and the face feature point received from the user apparatus 20. The invention is not limited thereto.

For example, the user apparatus 20 may be mounted with a GPS. The facility apparatus 10 may acquire the GPS' position detection information from the user apparatus 20 and display a user position on a facility map. Such construction can relatively accurately locate the user.

As another example, it may be preferable to install antennas at multiple places in the facility for detecting the user apparatus 20. The position information may indicate the position of an antenna that most intensely detects the user apparatus 20. The construction for locating the user can be simplified.

<4-9. Service Provider Determination Control Unit>

In the third embodiment, the facility apparatus 10 as the service provider determination control unit or means according to the embodiment determines a salesperson appropriate for the user based on each salesperson's specialized field, available language, and gender. The invention is not limited thereto. The salesperson may be determined in consideration for the other information such as his or her hobby.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

<Aspect>

Aspects of the subject matter described herein are set out in the following clauses.

According to a first aspect of the disclosure, an information communication system is provide as follows. The information communication system allows a service provider at a facility to appropriately attend a user visiting the facility in accordance with the user's intention. In the information communication system, a user carries a user apparatus and uses it to input his or her intention concerning a facility service provider. The user apparatus transmits intention specification information capable of specifying the intention to a facility apparatus capable of communicating with the user apparatus. The facility apparatus notifies the facility service provider of the user intention specified based on the intention specification information received from the user apparatus. As a result, the facility service provider can recognize the intention of the user visiting the facility and take appropriate action in accordance with the user intention.

In the information communication system, the user apparatus transmits the appearance specification information capable of specifying external characteristics of the user carrying the user apparatus to the facility apparatus. The facility apparatus notifies the user's external characteristics along with the user intention. The user's external characteristics are specified based on the appearance specification information received from the user apparatus. The facility service provider can identify the user corresponding to the notified user intention even when multiple users visit the facility and are unlocatable.

As an optional feature of the first aspect, an image generated by capturing the user may be displayed as the user's external characteristics specified based on the appearance specification information. The facility service provider can easily identify the user even though he or she is unknown.

It may be preferable for the user to easily input his or her intention concerning the facility service provider. As an optional feature of the first aspect, the intention input control unit may be constructed to be able to input the user intention based on the user's operation of choosing from prepared intention candidates. According to this construction, the user just needs to choose from the prepared intention candidates. The user can easily notify his or her intention to the facility service provider.

Further, the intention candidates may include the intention to wish the attendance by the facility service provider. When the intentions are selectable, the user can receive active attendance from the facility service provider by notifying the service provider that the user wishes to be attended by the service provider.

Further, the user can efficiently receive attendance from the service provider when the user can enter a timing to wish the attendance, i.e., a time point from when the user wants the attendance to start, as well as the intention to wish the attendance by the facility service provider. The user may wish attendance by the service provider immediately or a little while later. The service provider may or may not immediately attend the user when recognizing that the user wishes the attendance. When the user wishes attendance a little while later, making this information recognizable can help the service provider efficiently take action.

Further, the intention candidates may include the intention to refuse the attendance by the facility service provider. When the intentions are selectable, the user can refuse active attendance from the facility service provider by notifying the service provider that the user refuses to be attended by the service provider.

As an optional feature of the first aspect, the intention input control unit may be constructed to be able to input any information as the user intention. Such construction can flexibly transfer the user intention.

As an optional feature of the first aspect, the user apparatus may transmit the user information capable of specifying at least one of the user's attribute and preference to the facility apparatus. The facility apparatus may notify the information about the user specified based on the user information received from the user apparatus as well as the user's intention and external characteristics. In the information communication system according to such construction, the facility service provider can recognize not only the user's intention but also his or her attribute and preference. As a result, the service provider can actively provide services suited for the user.

In the information communication system according to the first aspect, the facility apparatus notifies the user's intention and external characteristics. The facility service provider can find and attend the user even when the user is unlocatable. However, it is preferable to recognize information about the user position when it is difficult to find the user in a large facility.

As an optional feature of the first aspect, the facility apparatus may locate the user carrying the user apparatus in the facility and notify the detected user position as well as the user's intention and external characteristics. According to this construction, the facility service provider can easily find the user.

When there are multiple service providers who can attend the user, it is preferable to assign a service provider appropriate for the user. As an optional feature of the first aspect, the facility apparatus may store information about service providers at the facility. The facility apparatus may determine and notify a service provider appropriate for the user based on the information received from the user apparatus and the stored information. Such construction can urge an appropriate service provider to attend the user.

As an optional feature of the first aspect, the user apparatus may signify a mobile telephone terminal. Since many users carry mobile telephone terminals, the information communication system according to the first aspect is available without needing for the user to carry a dedicated apparatus.

As another aspect of the disclosure, the facility apparatus included in the above information communication system of the first aspect is provided.

As another aspect of the disclosure, the user apparatus included in the above information communication system of the first aspect is provided.

According to another aspect of the disclosure, a method is provided for controlling the above facility apparatus. The method comprises: notifying a service provider at the facility of a user intention specified based on the intention specification information along with external characteristics of a user specified based on appearance specification information received from the user apparatus under condition that the intention specification information is received from the user apparatus. Relating to this aspect, as yet another aspect of the disclosure, a computer readable medium comprising instructions being executed by a computer is provided, wherein the instructions includes the above method for controlling the facility apparatus and the method is computer-implemented.

According to another aspect of the disclosure, a method is provided for controlling the above user apparatus. The method comprises: (i) supplying an intention of a user carrying the user apparatus to a service provider at the facility; (ii) transmitting intention specification information capable of specifying an input user intention to a facility apparatus capable of communicating with the user apparatus under condition that a user intention is input; and (iii) transmitting appearance specification information capable of specifying external characteristics of a user carrying the user apparatus to a facility apparatus capable of communicating with the user apparatus. Relating to this aspect, as yet another aspect of the disclosure, a computer readable medium comprising instructions being executed by a computer is provided, wherein the instructions includes the above method for controlling the user apparatus and the method is computer-implemented.

It will be obvious to those skilled in the art that various changes may be made in the above-described embodiments of the present invention. However, the scope of the present invention should be determined by the following claims.

What is claimed is:

1. An information communication system comprising a user apparatus carried by a user and a facility apparatus provided for a facility a user may visit, wherein the user apparatus includes:

an intention input control unit for supplying an intention of a user carrying the user apparatus to a service provider at the facility;

an intention information transmission control unit for transmitting intention specification information capable of specifying an input user intention to a facility apparatus capable of communicating with the user apparatus under condition that the intention input control unit inputs a user intention; and an appearance information transmission control unit for transmitting appearance specification information capable of specifying external characteristics of a user carrying the user apparatus to a facility apparatus capable of communicating with the user apparatus; and wherein, the facility apparatus includes:
a notification control unit for notifying, when receiving the intention specification information from the user apparatus, a service provider at the facility of a user intention specified based on the intention specification information along with external characteristics of a user specified based on appearance specification information received from the user apparatus, and
wherein the intention input control unit is allowed to input a user intention based on a user's operation of selection from previously prepared intention candidates.

2. The information communication system according to claim 1,
wherein the notification control unit displays a user's captured image as external characteristics of a user specified based on the appearance specification information.

3. The information communication system according to claim 1,
wherein the intention candidate includes at least an intention to wish attendance by a service provider at the facility.

4. The information communication system according to claim 3,
wherein the intention input control unit is allowed to input a time, from when a start of attendance by a service provider is wished, as well as an intention to wish the attendance by the service provider at the facility.

5. The information communication system according to claim 1,
wherein the intention candidate includes at least an intention to refuse attendance by a service provider at the facility.

6. The information communication system according to claim 1,
wherein the intention input control unit is allowed to input any information as a user intention.

7. The information communication system according to claim 1,
wherein the user apparatus includes a user information transmission control unit that transmits user information capable of specifying at least one of an attribute and a preference of a user carrying the user apparatus to a facility apparatus capable of communicating with the user apparatus; and wherein the notification control unit notifies information about a user specified based on user information received from the user apparatus along with the user's intention specified based on the intention specification information and the user's external characteristics specified based on the appearance specification information.

8. The information communication system according to claim 1,
wherein the facility apparatus includes a position detection control unit for locating a user carrying the user apparatus at a facility installed with the facility apparatus under condition that the intention specification information is received from the user apparatus; and
wherein the notification control unit notifies a user position detected by the position detection control unit along with the user's intention specified based on the intention specification information and the user's external characteristics specified based on the appearance specification information.

9. The information communication system according to claim 1,
wherein the facility apparatus includes
a service provider information storage device for storing information about a service provider at a facility installed with the facility apparatus, and
a service provider determination control unit for determining a service provider appropriate for a user carrying the user apparatus based on information received from the user apparatus and information stored in the service provider information storage device under condition that the intention specification information is received from the user apparatus; and
wherein the notification control unit notifies a service provider determined by the service provider determination control unit along with a user's intention specified based on the intention specification information and user's external characteristics specified based on the appearance specification information.

10. The information communication system of claim 1, wherein the user apparatus is a mobile telephone terminal.

11. A facility apparatus used for an information communication system, the system including:
a user apparatus that is carried by a user and includes
an intention input control unit for entering a user intention concerning a service provider at a facility,
an intention information transmission control unit, and
an appearance information transmission control unit,
wherein, when the intention input control unit inputs a user intention, the intention information transmission control unit transmits intention specification information capable of specifying an input user intention to a facility apparatus capable of communication and the appearance information transmission control unit transmits appearance specification information capable of specifying user's external characteristics to a facility apparatus capable of communication; and
a facility apparatus that is provided for a facility a user may visit,
the facility apparatus comprising:
a notification control unit for notifying a service provider at the facility of a user intention specified based on the intention specification information along with external characteristics of a user specified based on appearance specification information received from the user apparatus under condition that the intention specification information is received from the user apparatus,
wherein the facility apparatus includes
a service provider information storage device for storing information about a service provider at a facility installed with the facility apparatus, and
a service provider determination control unit for determining a service provider appropriate for a user carrying the user apparatus based on information received from the user apparatus and information stored in the service provider information storage device under condition that the intention specification information is received from the user apparatus; and
wherein the notification control unit notifies a service provider determined by the service provider determination control unit along with a user's intention specified based on the intention specification information and user's external characteristics specified based on the appearance specification information.

12. The facility apparatus according to claim 11,
wherein the notification control unit displays a user's captured image as external characteristics of a user specified based on the appearance specification information.

13. The facility apparatus according to claim 11,
wherein the user apparatus includes a user information transmission control unit that transmits user information capable of specifying at least one of an attribute and a preference of a user carrying the user apparatus to a facility apparatus capable of communicating with the user apparatus; and
wherein the notification control unit notifies information about a user specified based on user information received from the user apparatus along with the user's intention specified based on the intention specification information and the user's external characteristics specified based on the appearance specification information.

14. The facility apparatus according to claim 11,
wherein the facility apparatus includes a position detection control unit for locating a user carrying the user apparatus at a facility installed with the facility apparatus under condition that the intention specification information is received from the user apparatus; and
wherein the notification control unit notifies a user position detected by the position detection control unit along with the user's intention specified based on the intention specification information and the user's external characteristics specified based on the appearance specification information.

15. A user apparatus used for an information communication system, the system including:
the user apparatus carried by a user; and
a facility apparatus that is provided for a facility possibly visited by a user and includes a notification control unit for notifying a service provider at the facility of a user intention specified based on intention specification information along with the user's external characteristics specified based on appearance specification information capable of specifying the user's external characteristics received from the user apparatus under condition that the intention specification information capable of specifying a user intention concerning the service provider at the facility is received from the user apparatus,
the user apparatus comprising:
an intention input control unit for supplying an intention of a user carrying the user apparatus to a service provider at the facility;
an intention information transmission control unit for transmitting intention specification information capable of specifying an input user intention to a facility apparatus capable of communicating with the user apparatus under condition that the intention input control unit inputs a user intention; and
an appearance information transmission control unit for transmitting appearance specification information capable of specifying external characteristics of a user carrying the user apparatus to a facility apparatus capable of communicating with the user apparatus
wherein the intention input control unit is allowed to input a user intention based on a user's operation of selection from prepared intention candidates.

16. The user apparatus according to claim 15,
wherein the appearance information transmission control unit of the user apparatus transmits information capable of specifying an image capturing a user as appearance specification information capable of specifying external characteristics of the user carrying the user apparatus.

17. The user apparatus according to claim 15,
wherein the intention candidate includes at least an intention to wish attendance by a service provider at the facility.

18. The user apparatus according to claim 17,
wherein the intention input control unit is allowed to input a time, from when a start of attendance by a service provider is wished, as well as an intention to wish the attendance by the service provider at the facility.

19. The user apparatus according to claim 15,
wherein the intention candidate includes at least an intention to refuse attendance by a service provider at the facility.

20. The user apparatus according to claim 15,
wherein the intention input control unit is allowed to input any information as a user intention.

21. The user apparatus according to claim 15,
wherein the user apparatus includes a user information transmission control unit that transmits user information capable of specifying at least one of an attribute and a preference of a user carrying the user apparatus to a facility apparatus capable of communicating with the user apparatus; and
wherein the notification control unit notifies information about a user specified based on user information received from the user apparatus along with the user's intention specified, based on the intention specification information and the user's external characteristics specified based on the appearance specification information.

22. A non-transitory computer readable medium comprising instructions being executed by a computer, the instructions for controlling a facility apparatus, the method being computer-implemented, the instructions comprising:
notifying a service provider at the facility of a user intention specified based on the intention specification information along with external characteristics of a user specified based on appearance specification information received from a user apparatus carried under condition that the intention specification information is received from the user apparatus,
storing information about a service provider at a facility installed with the facility apparatus;
determining a service provider appropriate for a user carrying the user apparatus based on information received from the user apparatus and information stored in the service provider information storage device under condition that the intention specification information is received from the user apparatus;
wherein the service provider which is determined is notified of the user intention specified based on the intention specification information and user's external characteristics specified based on the appearance specification information.

23. A non-transitory computer readable medium comprising instructions being executed by a computer, the instructions for controlling a user apparatus, the method being computer-implemented, the instructions comprising:
supplying an intention of a user carrying the user apparatus to a service provider at the facility;
transmitting intention specification information capable of specifying an input user intention to a facility apparatus configured to communicate with the user apparatus under condition that the user intention is input; and
transmitting appearance specification information configured to specify external characteristics of the user carrying the user apparatus to the facility apparatus configured to communicate with the user apparatus, wherein the user intention is input based on a user's operation of selection from prepared intention candidates.

24. An information communication system comprising a user apparatus carried by a user and a facility apparatus provided for a facility a user may visit, wherein the user apparatus includes:

an intention input control unit for supplying an intention of a user carrying the user apparatus to a service provider at the facility;

an intention information transmission control unit for transmitting intention specification information capable of specifying an input user intention to a facility apparatus capable of communicating with the user apparatus under condition that the intention input control unit inputs a user intention; and an appearance information transmission control unit for transmitting appearance specification information capable of specifying external characteristics of a user carrying the user apparatus to a facility apparatus capable of communicating with the user apparatus; and wherein, the facility apparatus includes:

a notification control unit for notifying, when receiving the intention specification information from the user apparatus, a service provider at the facility of a user intention specified based on the intention specification information along with external characteristics of a user specified based on appearance specification information received from the user apparatus;

wherein the facility apparatus includes a service provider information storage device for storing information about a service provider at a facility installed with the facility apparatus, and a service provider determination control unit for determining a service provider appropriate for a user carrying the user apparatus based on information received from the user apparatus and information stored in the service provider information storage device under condition that the intention specification information is received from the user apparatus; and wherein the notification control unit notifies a service provider determined by the service provider determination control unit along with a user's intention specified based on the intention specification information and user's external characteristics specified based on the appearance specification information.

\* \* \* \* \*